United States Patent
Thompson et al.

(10) Patent No.: US 9,926,807 B2
(45) Date of Patent: Mar. 27, 2018

(54) GENERATOR TEMPERATURE MANAGEMENT FOR THROTTLE LOSS RECOVERY SYSTEMS

(71) Applicant: HONEYWELL INTERNATIONAL INC., Morristown, NJ (US)

(72) Inventors: Glenn F. Thompson, Palos Verdes Estates, CA (US); Patrick Beresewicz, La Mirada, CA (US); Mike Guidry, Redondo Beach, CA (US); Andrew Love, Lorraine (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 260 days.

(21) Appl. No.: 14/638,232

(22) Filed: Mar. 4, 2015

(65) Prior Publication Data
US 2016/0258321 A1    Sep. 8, 2016

(51) Int. Cl.
*H02K 9/22* (2006.01)
*F01D 25/14* (2006.01)
(Continued)

(52) U.S. Cl.
CPC ........... *F01D 25/145* (2013.01); *F01D 5/021* (2013.01); *F01D 9/026* (2013.01); *F01D 9/041* (2013.01);
(Continued)

(58) Field of Classification Search
CPC .......... F01D 15/10; F01D 17/02; F01D 25/14; F01D 25/145; F01D 25/16; F01D 25/162;
(Continued)

(56) References Cited

U.S. PATENT DOCUMENTS

| 5,394,848 A | 3/1995 | Tsutsumi et al. |
| 6,145,314 A | 11/2000 | Woollenweber |

(Continued)

FOREIGN PATENT DOCUMENTS

| DE | 102013213435 A1 | 1/2015 |
| EP | 2067960 A1 | 6/2009 |

(Continued)

OTHER PUBLICATIONS

Extended EP Search Report for Application No. 16156405.9-1603 dated Jul. 21, 2016.

(Continued)

*Primary Examiner* — Julio C Gonzalez
*Assistant Examiner* — S. Mikailoff
(74) *Attorney, Agent, or Firm* — Lorenz & Kopf, LLP (57) ABSTRACT

Turbine assemblies, loss recovery systems, and related fabrication methods are provided for managing temperatures associated with an electrical generator. One exemplary turbine assembly suitable for use in a loss recovery system includes a wheel configured to rotate in response to a portion of a fluid flow bypassing a flow control valve, a generator including a stator assembly disposed about a rotor coupled to the wheel to rotate in response to rotation of the wheel, a conductive structure in contact with the stator assembly, and an insulating structure radially encompassing the conductive structure and the generator. The conductive structure accesses at least a portion of the fluid flow bypassing the flow control valve and impacting the wheel, thereby providing thermal coupling between the stator assembly and the bypass fluid flow to transfer heat from the stator assembly to the bypass fluid flow via the conductive structure.

20 Claims, 5 Drawing Sheets

(51) Int. Cl.

| | | |
|---|---|---|
| *F01D 15/10* | (2006.01) | |
| *F02D 9/10* | (2006.01) | |
| *F01D 5/02* | (2006.01) | |
| *F01D 9/02* | (2006.01) | |
| *F01D 9/04* | (2006.01) | |
| *H02K 7/18* | (2006.01) | |
| *H02K 9/04* | (2006.01) | |
| *F02M 35/10* | (2006.01) | |
| *F01D 17/02* | (2006.01) | |
| *F01D 25/16* | (2006.01) | |
| *F02D 29/06* | (2006.01) | |
| *F02D 9/02* | (2006.01) | |

(52) U.S. Cl.
CPC ............ *F01D 15/10* (2013.01); *F01D 17/02* (2013.01); *F01D 25/14* (2013.01); *F01D 25/16* (2013.01); *F01D 25/162* (2013.01); *F02D 9/1055* (2013.01); *F02D 29/06* (2013.01); *F02M 35/10229* (2013.01); *H02K 7/1823* (2013.01); *H02K 9/04* (2013.01); *F02D 2009/0283* (2013.01); *F05D 2220/30* (2013.01); *F05D 2220/62* (2013.01); *F05D 2220/76* (2013.01); *F05D 2230/60* (2013.01); *F05D 2240/12* (2013.01); *F05D 2240/24* (2013.01); *F05D 2250/82* (2013.01); *F05D 2260/221* (2013.01); *F05D 2260/22141* (2013.01); *F05D 2260/606* (2013.01); *F05D 2300/5024* (2013.01)

(58) Field of Classification Search
CPC .......... F01D 5/021; F01D 9/026; F01D 9/041; F02D 2009/0283; F02D 9/1055; F02M 35/10229; F05D 2220/30; F05D 2220/62; F05D 2220/76; F05D 2230/60; F05D 2240/12; F05D 2240/24; F05D 2250/82; F05D 2260/221; F05D 2260/22141; F05D 2260/606
See application file for complete search history.

(56) References Cited

U.S. PATENT DOCUMENTS

| | | | |
|---|---|---|---|
| 8,446,029 B2 | 5/2013 | Smith et al. | |
| 8,544,262 B2* | 10/2013 | Reyenga | F01D 15/10 60/397 |
| 2001/0036062 A1 | 11/2001 | Daly et al. | |
| 2009/0167101 A1* | 7/2009 | Saga | H02K 3/522 310/45 |
| 2009/0229898 A1 | 9/2009 | Fujino et al. | |
| 2009/0288577 A1 | 11/2009 | Kumar | |
| 2010/0247343 A1* | 9/2010 | Shimizu | F01D 25/12 417/410.1 |
| 2011/0241344 A1 | 10/2011 | Smith et al. | |
| 2011/0265882 A1* | 11/2011 | Reyenga | F01D 15/10 137/1 |
| 2011/0271936 A1 | 11/2011 | Reyenga et al. | |
| 2013/0091844 A1 | 4/2013 | Leone et al. | |
| 2014/0261250 A1 | 9/2014 | Katayama et al. | |
| 2015/0040860 A1 | 2/2015 | Reyenga et al. | |
| 2015/0167467 A1 | 6/2015 | Reyenga et al. | |
| 2016/0179116 A1 | 6/2016 | Bacque et al. | |
| 2016/0226346 A1* | 8/2016 | Roberts | H02K 7/14 |
| 2016/0258312 A1 | 9/2016 | Love et al. | |
| 2016/0258314 A1 | 9/2016 | Love et al. | |
| 2016/0258394 A1 | 9/2016 | Guidry et al. | |

FOREIGN PATENT DOCUMENTS

| | | |
|---|---|---|
| EP | 3064749 A1 | 9/2016 |
| JP | S6172859 A | 4/1986 |
| JP | H0681668 A | 3/1994 |
| JP | 2000130176 A | 5/2000 |
| WO | 3604487 A1 | 2/1996 |
| WO | 2011139725 A2 | 11/2011 |
| WO | 2011156056 A2 | 12/2011 |
| WO | 2012151383 A1 | 11/2012 |
| WO | 2013163128 A1 | 10/2013 |

OTHER PUBLICATIONS

Extended EP Search Report for Application No. 16156403A-1603 dated Jul. 22, 2016.
Love, A et al.; Temperature Management for Throttle Loss Recovery Systems, U.S. Appl. No. 14/827,746, filed Aug. 17, 2015.
Guidry, M et al.; Excess Power Dissipation for Throttle Loss Recovery Systems, U.S. Appl. No. 14/827,791, filed Aug. 17, 2015.
Love, A et al.; Temperature Management for Throttle Loss Recovery Systems, U.S. Appl. No. 14/827,791, filed Aug. 17, 2015.
USPTO Notice of Allowance for U.S. Appl. No. 14/827,791 dated Jan. 30, 2017.
USPTO Restriction Requirement for U.S. Appl. No. 14/827,828 dated Jan. 26, 2017.
Extended EP Search Report for Application No. 16183871.9-1603 dated Jan. 19, 2017.
Extended EP Search Report for Application No. 16183647.3-1603 dated Dec. 16, 2016.

* cited by examiner

GENERATOR TEMPERATURE MANAGEMENT FOR THROTTLE LOSS RECOVERY SYSTEMS

TECHNICAL FIELD

The subject matter described herein relates generally to flow control systems, and more particularly, to managing generator temperatures in a throttle loss recovery system.

BACKGROUND

The throttling of intake air is a known way of controlling the output of an engine, such as an internal combustion engine. Often, internal combustion engines use throttle bodies to throttle the intake air to the desired flow rate. However, the throttling of air may cause a loss in efficiency during partial throttle conditions. Specifically, throttle bodies in some embodiments use butterfly valves to throttle the flow of intake air. While butterfly valves are known for their simplicity and reliability, they provide the throttling function by constricting the air intake path to a smaller area, which creates flow losses.

Prior art solutions have been developed which seek to control the flow of intake air while recovering some of the energy lost in the throttling process. For example, throttled intake air may be directed to a turbine, which drives a generator to produce electrical energy when the intake air is being restricted by the throttle. Generating electrical energy also produces heat as a byproduct, however, since the throttle loss recovery system is typically under the hood of a vehicle, the heat must be managed to avoid exceeding maximum operating temperatures of the various devices and components under the hood.

BRIEF SUMMARY

Turbine assemblies, loss recovery systems and related fabrication methods are provided for managing temperatures associated with an electrical generator. An exemplary turbine assembly includes a wheel configured to rotate in response to a portion of a fluid flow bypassing a flow control valve, a generator including a stator assembly disposed about a rotor coupled to the wheel to rotate in response to rotation of the wheel, a conductive structure in contact with the stator assembly, and an insulating structure radially encompassing the conductive structure and the generator. The conductive structure accesses at least a portion of the fluid flow bypassing the flow control valve and impacting the wheel, thereby providing thermal coupling between the stator assembly and the bypass fluid flow to transfer heat from the stator assembly to the bypass fluid flow via the conductive structure.

In another embodiment, a system is provided that includes a turbine and a generator. The turbine includes a volute for a portion of a fluid flow bypassing a flow control valve based on an orientation of the flow control valve with respect to the fluid flow and a wheel to rotate in response to the portion of the fluid flow. The generator includes a stator assembly radially circumscribing a rotor coupled to the wheel to rotate in response to rotation of the wheel. Also included are a conductive structure in contact with the stator assembly and accessing the portion of the fluid flow within the volute and an insulating structure radially circumscribing the conductive structure and the generator.

In another embodiment, a method of fabricating a turbine assembly is provided. The method involves forming a conductive structure in contact with a stator assembly, forming an insulating structure about the conductive structure and the stator assembly after forming the conductive structure in contact with the stator assembly, and mechanically coupling a turbine wheel to a rotor disposed within the stator assembly. The conductive structure is configured to access a portion of a fluid flow bypassing a flow control valve based on an orientation of the flow control valve with respect to the fluid flow, the turbine wheel is arranged to rotate in response to the portion of the fluid flow, and the rotor rotates in response to rotation of the turbine wheel.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein relate to vehicle systems that include a flow control assembly that functions as a bypass for fluid flow around a flow control valve to generate energy from the fluid flow. For purposes of explanation, the subject matter is described herein in the context of a turbine assembly that functions as a bypass for a throttle and generates energy that helps to offset or otherwise compensate for losses or other inefficiencies resulting from throttling the intake air. However, it should be appreciated that the subject matter described herein is not limited to use with turbines or throttles, and may be implemented in an equivalent manner for other suitable mechanical devices or flow control assemblies that are arranged to provide a bypass for another suitable flow control valve. Additionally, while the subject matter is described herein in the context of a the turbine assembly being configured as a turbo generator, the subject matter described herein is not limited to use with turbo generators and may be implemented in an equivalent manner for turbochargers or other suitable arrangements.

In exemplary embodiments described herein, the electrical generator associated with the turbine assembly is in thermal communication with the air bypassing the throttle, which typically has a colder temperature than the under the hood temperatures near the turbine assembly. In this manner, the electrical generator is effectively cooled by the bypass air while being packaged under the hood. As described in greater detail below in the context of FIGS. 3-5, in exemplary embodiments, at least a portion of the generator stator assembly is fit, inserted, or otherwise provided within a thermally conductive sleeve structure that is configured to extend from the stator assembly and access the air bypassing the throttle. For example, the stator assembly may be press fit within the conductive sleeve structure to provide direct physical contact, and thereby efficient heat transfer, between the stator assembly and the conductive sleeve. At least a portion of the conductive sleeve is exposed to the bypass air to facilitate heat transfer from the conductive sleeve to the bypass air, thereby establishing a path for heat transfer from the generator stator assembly to the bypass air indirectly via the conductive sleeve. In one or more embodiments, the portion of the conductive sleeve exposed to the bypass air defines a sidewall or boundary for a portion of a turbine volute or other conduit for the bypass air that flows through the turbine. In some embodiments, the portion of the conductive sleeve may also include or otherwise be coupled to conductive features that are positioned within the volute or conduit for the bypass air such that they interrupt or otherwise interfere with the flow of the bypass air. While the subject matter may be described herein in the context of the conductive sleeve providing thermal communication with ambient air or charge air upstream of the throttle that is provided to the turbine inlet upstream of the turbine wheel, it should be appreciated that in alternative embodiments, the conductive sleeve may be configured to additionally or alternatively provide thermal communication with the turbine exhaust air downstream of the turbine wheel.

In exemplary embodiments, the conductive sleeve structure and the generator stator assembly are encompassed at least radially by an insulating structure, which functions as a generator housing that inhibits heat transfer between the generator and the surrounding under hood environment. For example, the assembled conductive sleeve and stator assembly may be overmolded to provide an insulating structure comprised of a thermoplastic molding compound that radially circumscribes or otherwise encompasses the conductive sleeve and the stator assembly. The insulating structure may also include features configured to support mounting, joining, or otherwise affixing the generator assembly to a housing structure that defines the inlet/outlet conduits of the turbine. In this regard, portions of the insulating structure and the conductive sleeve may define a portion of the volute (or other inlet conduit) of the turbine, while the turbine housing defines the remaining portion of the volute when joined with the stator assembly.

Figure 1:
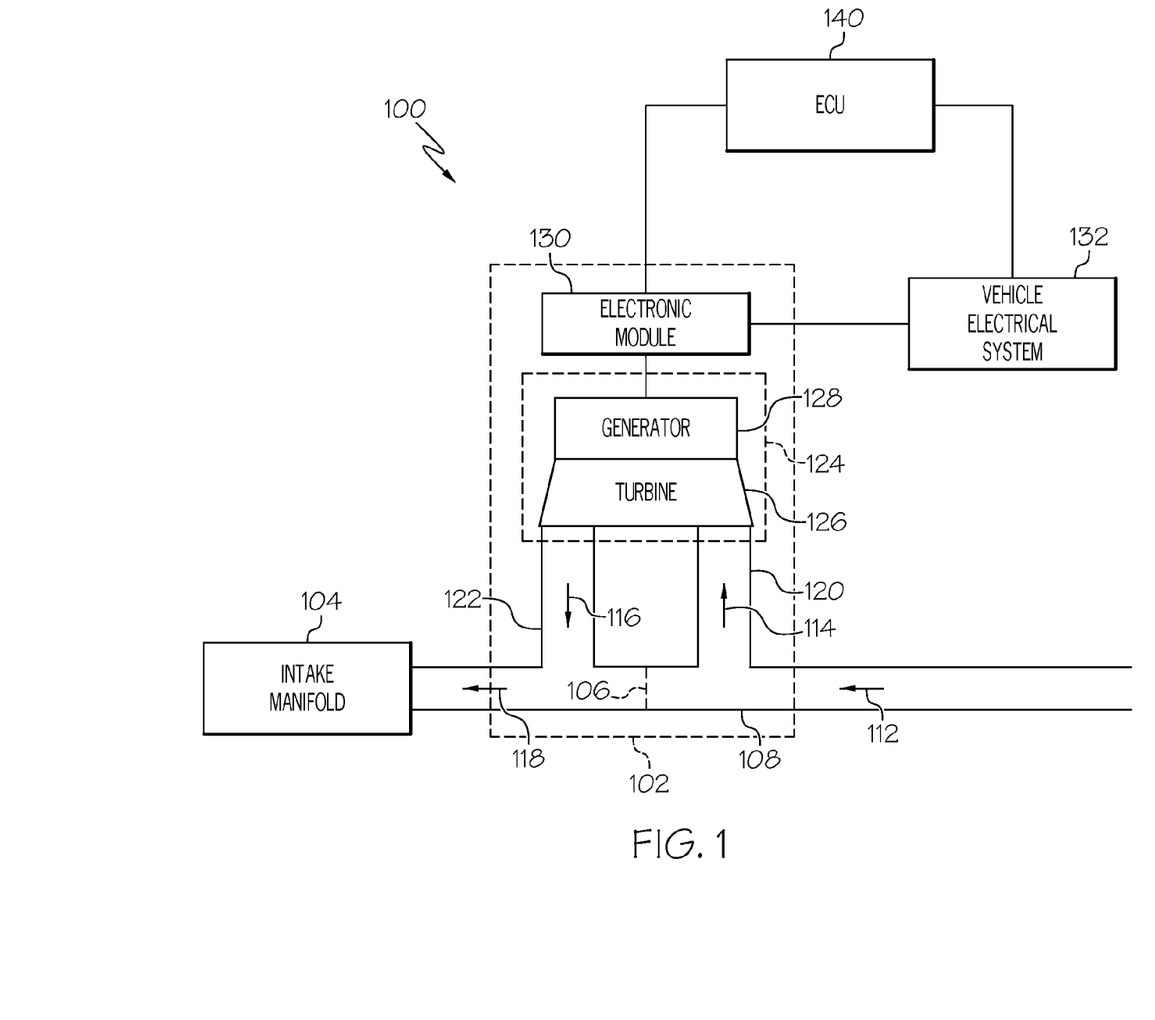
FIG. 1 is a block diagram of a vehicle system including a throttle loss recovery system in one or more exemplary embodiments.

FIG. 1 depicts an exemplary embodiment of a vehicle system 100 that includes a throttle loss recovery (TLR) assembly 102 configured to modulate the flow of fluid to an intake manifold 104 of an engine. The TLR assembly 102 includes a throttle 106 disposed within a conduit 108 for fluid 112 to be supplied to the engine intake. In some embodiments, the fluid 112 is realized as ambient air received via a port or inlet upstream of the TLR assembly 102. In other embodiments, the fluid 112 is realized as cooled charge air from the output of a charge air cooler (or intercooler). In this regard, the input fluid flow 112 may include compressed air.

The TLR assembly 102 includes a conduit 120 that adjoins the engine intake conduit 108 upstream of the throttle 106 and has an inlet configured to selectively receive at least a portion 114 of the input fluid flow 112 in a manner that is influenced by the orientation (or angle) of the throttle 106 with respect to the input fluid flow 112. In this regard, as the angle of the throttle 106 with respect to the input fluid flow 112 increases to restrict the amount of the input fluid flow 112 that passes the throttle 106 to the intake manifold 104, the amount of fluid flow 114 bypassing the throttle 106 through the conduit 120 increases, which, in turn, increases the potential electrical energy that may be generated by the turbine assembly 124. Conversely, as the angle of the throttle 106 with respect to the input fluid flow 112 decreases to allow more of the input fluid flow 112 to pass the throttle 106 to the intake manifold 104, the amount of bypass fluid flow 114 entering the conduit 120 decreases.

The outlet of the conduit 120 is coupled to the inlet (or input) of a turbine assembly 124 to establish fluid communication between the intake conduit 108 upstream of the throttle 106 and the inlet of a turbine 126 of the turbine assembly 124. In this regard, the bypass fluid flow 114 functions as the turbine input fluid flow that passes through the volute, nozzle, or and/or vanes of the turbine 126 and impacts the blades (or wheel) of the turbine 126 to rotate the turbine 126. In the illustrated embodiment, the turbine assembly 124 includes an electrical generator 128 coupled to the turbine 126 via a shaft, and the electrical generator 128 generates electrical energy in response to the rotation of the shaft caused by the turbine input fluid flow 114. The TLR assembly 102 includes another conduit 122 having an inlet coupled to the outlet of the turbine 126 and an outlet coupled to the intake conduit 108 downstream of the throttle 106 to establish fluid communication between the turbine 126 and the intake conduit 108 for the turbine output fluid flow 116. The turbine output fluid flow 116 combines with whatever portion of the input fluid flow 112 passes the throttle 106 to provide the intake fluid flow 118 supplied to the intake manifold 104.

Figure 2:
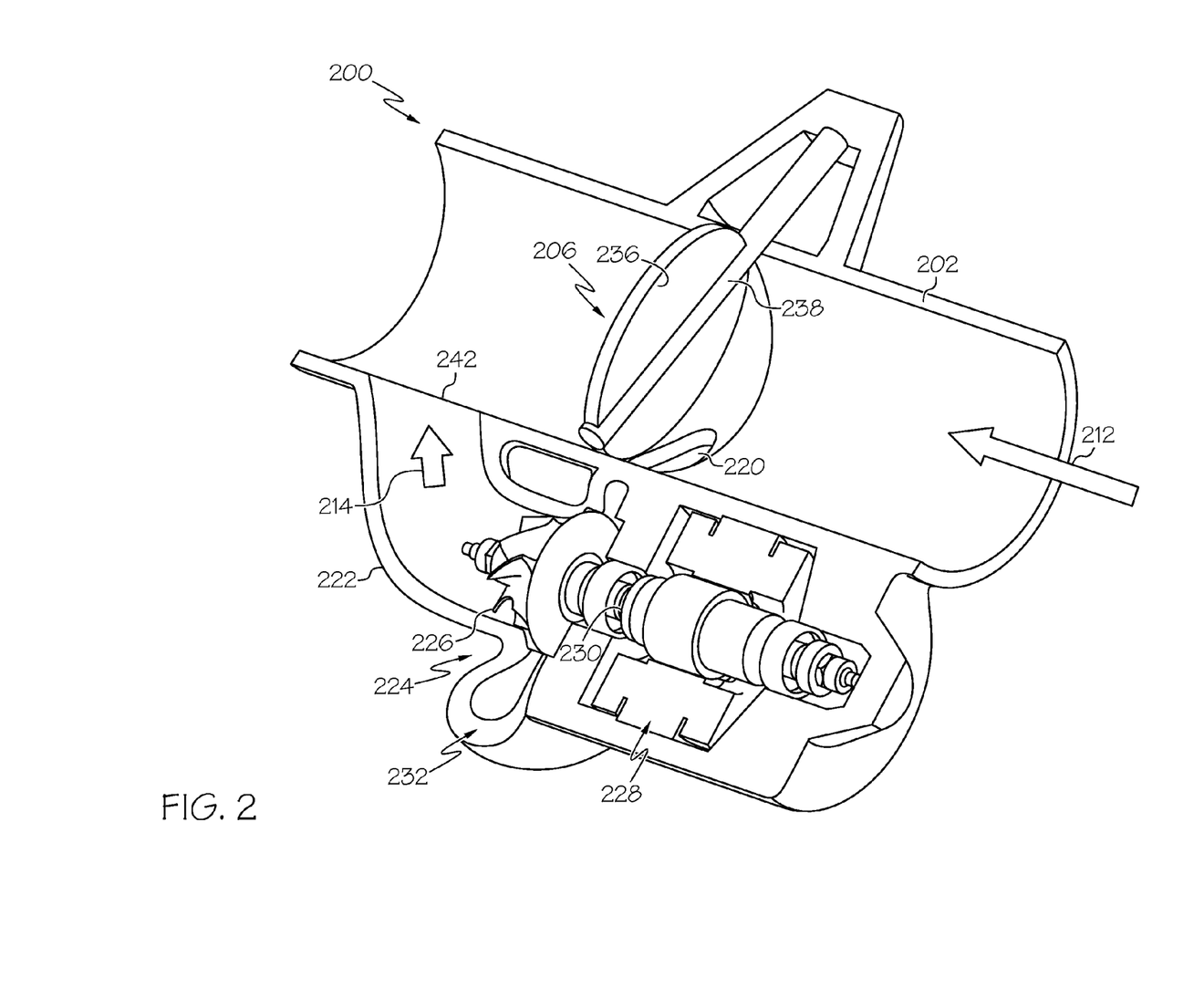
FIG. 2 is a cross-sectional view of a throttle loss recovery system suitable for use in the vehicle system of FIG. 1 in an exemplary embodiment.

FIG. 2 depicts a cross-sectional view of an exemplary embodiment of a TLR assembly 200 suitable for use as the TLR assembly 102 in the vehicle system 100 of FIG. 1. The TLR assembly 200 includes a fluid conduit 202 which is configured to receive flow 212 of an input fluid and a throttle 206, is positioned in the fluid conduit 202. In the illustrated embodiment, the turbine inlet conduit includes an inlet 220 which may be defined at least in part by the intake conduit 202 and configured to selectively receive at least a portion of the input fluid flow 212 from the intake conduit 202. The turbine wheel 226 is mounted on a shaft 230 coupled to an electrical generator 228, which is configured to produce electrical energy when the turbine wheel 226 rotates. The illustrated turbine assembly 224 includes a volute 232, which substantially surrounds the turbine 226 and supplies the portion of the input fluid flow 212 received via the inlet 220 to the turbine 226. As illustrated, in some embodiments, the intake conduit 202, the turbine outlet conduit 222, and the volute 232 may be defined by an integral housing, which also retains the turbine 226 and the generator 228 to provide the TLR assembly 200 with a relatively compact form.

In exemplary embodiments, the throttle 206 is configurable between multiple positions. For instance, in some embodiments, the throttle 206 is realized as a butterfly valve that includes a throttle plate 236. An adjustment mechanism such as an electric motor or throttle cable may be configured to control the throttle 206 by adjusting the position of the throttle plate 236, for example, by rotating a shaft 238 to which the throttle plate 236 is coupled about its longitudinal axis. In practice, a position sensor may detect the position of the throttle plate 236 or the shaft 238 and provide feedback as to the position of the throttle plate 236 such that the position of the throttle 206 may be adjusted to achieve a desired intake fluid flow downstream of the throttle 206. In this regard, FIG. 2 depicts the throttle 206 opened to a point at which the inlet 220 to the turbine 226 is substantially fully unblocked. Thus, the turbine assembly 224 acts as a bypass around the throttle 206 when at least a portion of the inlet 220 is not obstructed by the throttle plate 236. At least a portion of the input fluid flow 212 enters the volute 232 via the inlet 220, which feeds the turbine 226, and the turbine output fluid flow 214 exiting the turbine 226 passes through the turbine outlet conduit 222 and reenters the intake conduit 202 downstream of the throttle 206 via an outlet 242. As illustrated, the outlet 242 may be defined by an opening in the sidewall of the intake conduit 202 downstream of the throttle 206. It will be appreciated that the orientation of the throttle plate 236 with respect to the input fluid flow 212 will vary during operation, which, in turn, will vary the amount of the input fluid flow 212 that is redirected or otherwise bypasses the throttle via the turbine assembly 224.

Referring again to FIG. 1, the turbine assembly 124 also includes an electronics module 130 that is coupled between the generator 128 and the vehicle electrical system 132. The electronics module 130 includes the electrical elements or components that are configured to receive the electrical energy generated by the generator 128 and provide an interface between the output of the generator 128 and the vehicle electrical system 132 for delivering the generated electrical energy to the vehicle electrical system 132. For example, the electronics module 130 may include a rectifier coupled to a voltage bus associated with the vehicle electrical system 132 to rectify the output of the generator 128 to a direct current voltage level corresponding to the voltage bus. Additionally, in some embodiments, the electronics module 130 may include resistors, capacitors, inductors, diodes, transistors, and/or other electrical circuit elements configured to dissipate at least a portion of the electrical energy generated by the generator 128. The electronics module 130 may also include a control module that is configured to control operations of the turbine assembly 124, for example, by varying the geometry of the turbine 126 (e.g., in the case of a variable geometry turbine), varying the amount of generated electrical energy that is output to the vehicle electrical system 132, and the like. In this regard, the control module of the electronics module 130 may be coupled to the electronic control unit (ECU) 140 and configured to support operation of the TLR assembly 102.

Figure 3:
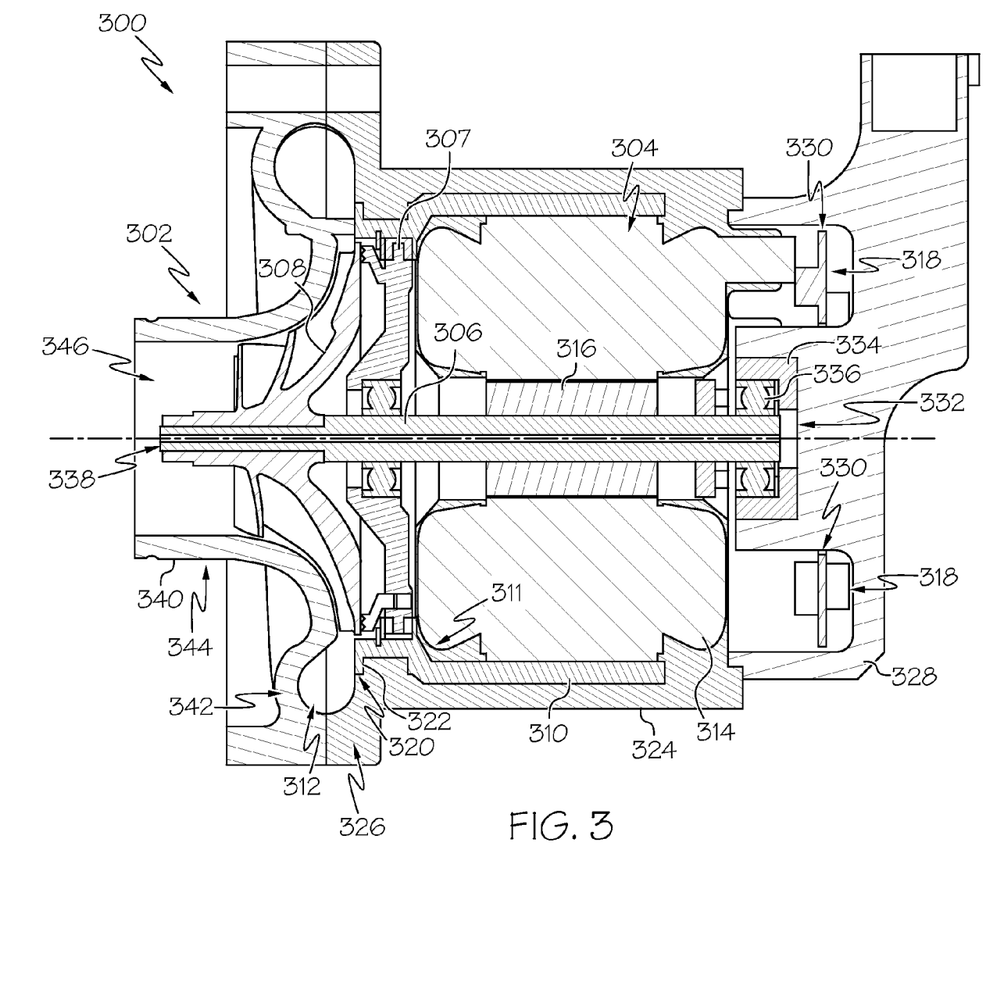
FIG. 3 is a cross-sectional view of a turbine assembly suitable for use in a throttle loss recovery system in accordance with one or more exemplary embodiments.

FIG. 3 depicts an exemplary embodiment of a turbine assembly 300 suitable for use as the turbine assembly 124 in the TLR assembly 102 of FIG. 1. The turbine assembly 300 includes a turbine 302 (e.g., turbine 126) that is coupled to a generator 304 (e.g., generator 128) via a rotary shaft 306 configured to rotate in unison with a wheel 308 of the turbine 302. A conductive structure 310 contacts the generator 304 and extends from the generator 304 in an axial direction towards the turbine 302 to access a conduit 312 for the fluid flow through the turbine 302. At least a portion 320 of the conductive structure 310 is exposed to the fluid flow through the turbine 302 to provide thermal communication between the fluid flow through the turbine and the generator 304. Thus, in the illustrated embodiment, when the turbine assembly 300 is incorporated in a TLR assembly 102 upstream of the intake manifold 104 of an engine, the conductive structure 310 provides thermal communication between the ambient air or charge air upstream of the turbine wheel 308 (e.g., turbine input fluid flow 114), thereby cooling the generator 304 more efficiently than the air under the hood of the vehicle that typically surrounds the turbine assembly 300 during operation of the vehicle.

The illustrated generator 304 includes a substantially cylindrical stator assembly 314 having a hollow interior having the rotary shaft 306 disposed therein. The stator assembly 314 includes a stator core that supports one or more sets of stator windings (or coils), which are connected to an electronics assembly 318 (e.g., electronics module 130) configured to provide an electrical interface to the generator 304. A rotor 316 of the generator 304 is disposed, formed, or otherwise provided on the shaft 306 within the hollow interior of the stator 314 and fixedly joined to the shaft 306 so that the rotor 316 rotates in unison with the shaft 306. In some embodiments, the rotor 316 may be integrated with the shaft 306.

In exemplary embodiments, the conductive structure 310 is realized as a metallic sleeve that circumscribes the generator 304 radially and extends in an axial direction towards the turbine 302. For example, the conductive structure 310 may be realized as aluminum that is shrink-fit about the periphery of the stator assembly 314, so that the inner surface of a generator retaining portion (defined by a shoulder portion 311) of the conductive sleeve 310 directly contact the outer surface of at least a portion of the generator stator 314 to provide thermal coupling to the generator stator 314. The conductive sleeve 310 extends in the axial direction towards the turbine 302 so that at least an end portion 320 is exposed to the fluid flow through the turbine conduit 312. In the illustrated embodiment, the end portion 320 includes a protruding feature 322 that extends substantially in a radial direction to increase the surface area of the end portion 320 that is exposed to the fluid flow within the conduit 312. The end portion 320 and/or the protruding feature 322 may be machined or otherwise formed to define at least a portion of the turbine conduit 312. A shoulder portion 311 of the conductive sleeve 310 reduces the inner circumference of the conductive sleeve 310 proximate the turbine 302 to retain the generator stator 314 and inhibit displacement of the generator stator 314. Additionally, the shoulder portion 311 may be machined or formed to define a bearing retaining portion of the conductive sleeve 310 between the shoulder portion 311 and the end portion 320, with the bearing retaining portion being configured to support a bearing assembly 307 that circumscribes and supports the rotary shaft 306 between the generator 304 and the turbine wheel 308.

After the conductive sleeve 310 is formed, an insulating structure 324 that functions as part of the generator housing is formed about conductive sleeve 310 and the generator stator 314. In this regard, the conductive sleeve 310 radially circumscribes or otherwise encompasses the conductive sleeve 310 and the generator stator 314 in the axial direction to thermally and electrically isolate the conductive sleeve 310 and the generator stator 314 from the surrounding environment. In exemplary embodiments, the insulating structure 324 is realized as a molding compound that is formed over the generator 304 by thermoplastic overmolding. In exemplary embodiments, the insulating structure 324 is formed to include a shoulder portion 326 that defines at least a portion of the turbine conduit 312.

Fabrication of the illustrated generator assembly is completed by mounting, joining, or otherwise affixing a capping structure 328 to the generator 304 at the end of the generator 304 that is distal to the turbine 302 in the axial direction. In exemplary embodiments, the capping structure 328 is realized as a plastic material or another suitable insulating material that is welded or otherwise joined to the distal end of the insulating structure 324 to retain the generator 304 in the axial direction. The illustrated capping structure 328 includes a first recessed portion 330 configured to house or otherwise retain the electronics assembly 318 including the generator electronics (e.g., electronics module 130) in proximity to the distal end of the generator stator 314. A second recessed portion 332 of the capping structure 328 is configured to receive or otherwise retain the distal end of the shaft 306 in both the axial and radial directions. In this regard, bearings 336 radially circumscribe the distal end of the shaft 306 and are retained by dampening structure 334 that occupies the remainder of the recessed portion 332 between the bearings 336 and the capping structure 328.

To fabricate the turbine assembly 300, the turbine wheel 308 is mounted, disposed, or otherwise provided on an end portion 338 of the shaft 306 that extends or otherwise protrudes through the bearing assembly 307 in the axial direction. In exemplary embodiments, the turbine wheel 308 is fixedly attached to the protruding end 338 so that the turbine wheel 308 and the shaft 306 rotate in unison, which, in turn, results in the turbine wheel 308 and the generator rotor 316 rotating in unison. For example, the protruding portion 338 of the shaft 306 may include threads configured to mate with corresponding features on the turbine wheel 308, thereby allowing the turbine wheel 308 to be fastened or otherwise screwed on to the end portion 338 of the shaft 306. Thereafter, a turbine housing structure 340 that radially circumscribes the turbine wheel 308 is mounted or otherwise joined to the proximal portion 326 of the generator housing 324. In this regard, in some embodiments, the end portion 326 of the generator housing 324 may include one or more bore holes or other mounting features aligned with corresponding features on the turbine housing structure 340 to allow the housings 324, 340 to be bolted, screwed, or otherwise fastened together. In other embodiments, the housings 324, 340 may be welded, glued, or otherwise affixed to one another.

The illustrated turbine housing structure 340 includes a volute portion 342 that radially circumscribes the blades of the turbine wheel 308 to define a volute conduit 312 in conjunction with the shoulder portion 326 of the generator housing 324. The volute portion 342 is integral with an axial portion 344 that extends in the axial direction to radially circumscribe the remainder of the turbine wheel 308 and the protruding portion 338 of the shaft 306. The axial portion 344 is substantially cylindrical and has a hollow interior having the turbine wheel 308 and the protruding portion 338 disposed therein, and the axial portion 344 defines a second conduit 346 for fluid flow exiting the turbine 302 in the axial direction.

Referring FIG. 3 with reference to FIGS. 1-2, in exemplary embodiments, the turbine 302 is configured as a radial turbine, where the volute conduit 312 (e.g., volute 232) functions as part of the turbine inlet (e.g., turbine inlet conduit 120, 220) to receive the turbine input fluid flow 114 upstream of the throttle 106, and the axial conduit 346 functions as part of the turbine outlet (e.g., turbine outlet conduit 122, 222) to provide the turbine output fluid flow 116 to the engine intake conduit 108 downstream of the throttle 106. In this regard, the turbine wheel 308 rotates in response to the turbine input fluid flow 114 within the volute conduit 312. In such embodiments, the end portion 320 of the conductive sleeve 310 is exposed to the ambient or charge air upstream of the throttle 106 to provide thermal communication between the generator 304 and the relatively cooler ambient or charge air, thereby facilitating cooling of the generator 304 by dissipating heat from the generator stator 314 into the mass flow within the volute 312. Dissipating heat using the fluid flow within the volute 312 also raises the temperature of the turbine input fluid flow 114, which, in turn, increases the available power that may be generated by the turbine assembly 124, 300. Additionally, raising the temperature of the bypass air 114 reduces the risks of icing downstream of the turbine assembly 124, 300.

Still referring to FIG. 3, in exemplary embodiments, fabrication of the turbine assembly 300 is achieved by forming the conductive structure 310 that physically contacts the generator stator assembly 314, for example, by shrink-fitting the conductive structure 310 over the stator assembly 314 or otherwise inserting the stator assembly 314 into the generator retaining portion of the conductive structure 310. Thereafter, the insulating housing structure 324 is formed about the assembled conductive sleeve 310 and generator stator 314, for example, by thermoplastic overmolding to radially encompass, surround, or otherwise circumscribe the conductive sleeve 310 and generator stator 314. The rotary shaft 306 is mechanically coupled to the rotor 316 and inserted into the hollow interior of the stator assembly 314. The bearing assembly 307 is inserted into the conductive sleeve 310 to support the protruding end 338 of the shaft 306, and the bearings 336 and dampening structure 334 are provided on the opposite end of the generator 304. The electronics assembly 318 is electrically connected to the stator assembly 314 and mounted to the generator 304 within the recessed portion 330 of the capping structure 328, which is welded, joined, or otherwise affixed to the generator 304. After fabricating the generator assembly, the turbine wheel 308 is mechanically coupled to the generator rotor 316 by joining or otherwise mounting the turbine wheel 308 to the protruding end 338 of the shaft 306. Thereafter, the assembled turbine wheel 308 and generator assembly are mounted or otherwise joined to the turbine housing 340, which, in practice may be part of a TLR assembly 102, 200. For example, after assembling the wheel 308 on the shaft 306, the generator housing 324 may be mounted to the volute 232 of the TLR assembly 200, which may be integrated with the intake conduit 202 and the turbine outlet conduit 222.

Figure 4:
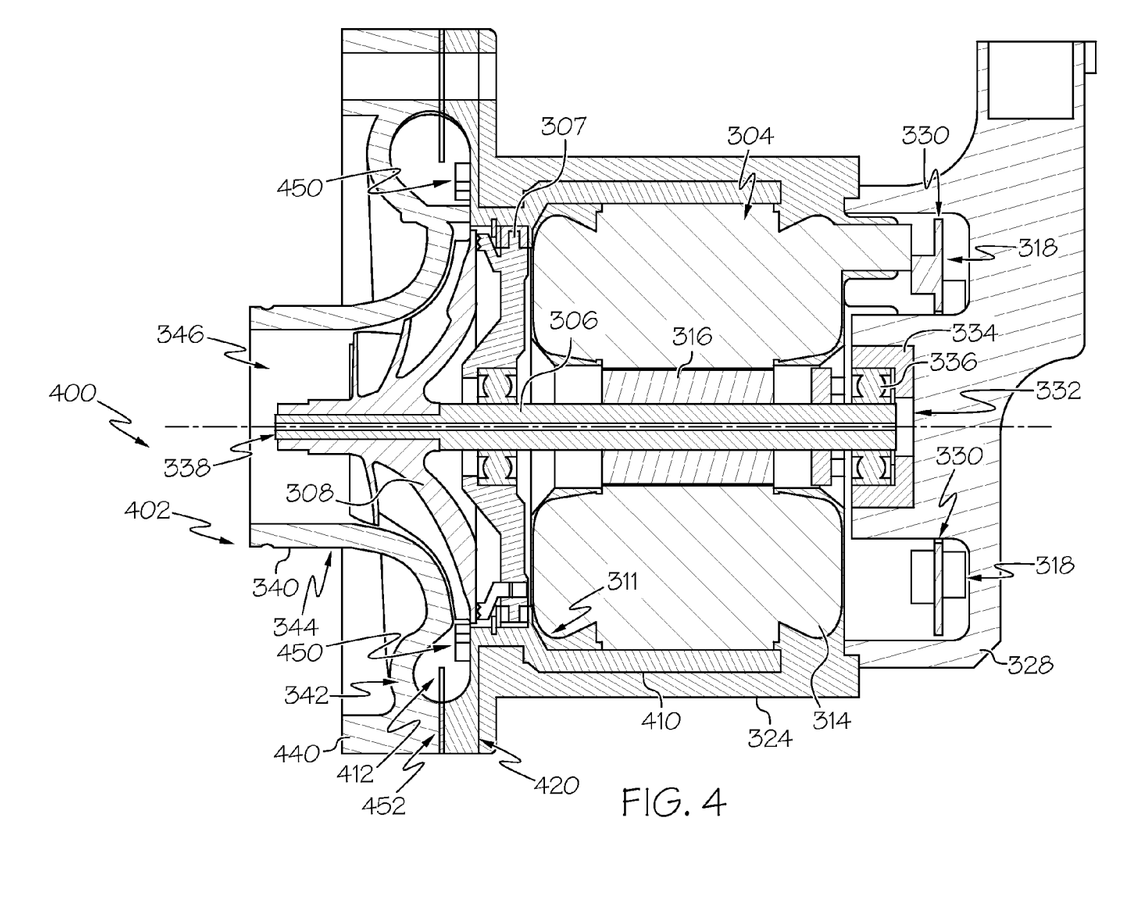
FIG. 4 is a cross-sectional view of another embodiment of a turbine assembly suitable for use in a throttle loss recovery system in accordance with one or more exemplary embodiments.

FIG. 4 depicts another embodiment of a turbine assembly 400 suitable for use as the turbine assembly 124 in the TLR assembly 102 of FIG. 1. Various elements or components of the turbine assembly 400 are similar to their counterparts described above in the context of FIG. 3, and the common features and/or functionality will not be redundantly described herein in the context of FIG. 4. In the embodiment of FIG. 4, the turbine 402 includes one or more guide vanes 450 within the volute conduit 412 configured to direct the fluid flow within the volute conduit 412 towards the turbine wheel 308. The guide vanes 450 are realized as a conductive material, and the guide vanes 450 are mounted or otherwise formed on the end portion 420 of the conductive sleeve 410. For example, the end portion 420 of the conductive sleeve 410 may be machined or otherwise configured to include guide vane features, resulting in guide vanes 450 that are integral with the end portion 420 of the conductive sleeve 410. The guide vanes 450 are thermally coupled to the end portion 420 of the conductive sleeve conductive sleeve 410, and thereby, increase the effective area of the conductive sleeve 410 that is exposed to the fluid flow within the volute conduit 412.

In the illustrated embodiment, the end portion 420 of the conductive sleeve 410 is also extended radially outward to define a greater percentage of the volute conduit 412 and provide a mounting surface for the turbine housing 440. In this regard, the surface area of the end portion 420 that defines the volute conduit 412 and is exposed to the turbine input fluid flow is increased relative to the turbine assembly 300 of FIG. 3. Moreover, the direct contact between the turbine housing 440 and the end portion 420 facilitates heat transfer from the conductive sleeve 410 to the turbine housing 440, which may further cool the generator 304.

Additionally, the illustrated end portion 420 contacts a volute divider 452, which is realized as a conductive structure that extends radially into the input fluid flow within the volute conduit 412, thereby increasing the effective area of the conductive sleeve 410 that is exposed to the fluid flow within the volute conduit 412 by virtue of the thermal coupling between the volute divider 452 and the conductive sleeve 410. For example, the volute divider 452 may be realized as an annular or donut-shaped plate-like conductive structure that is inserted between the turbine housing 440 and the generator assembly before mounting the turbine housing 440 to the generator assembly.

Figure 5:
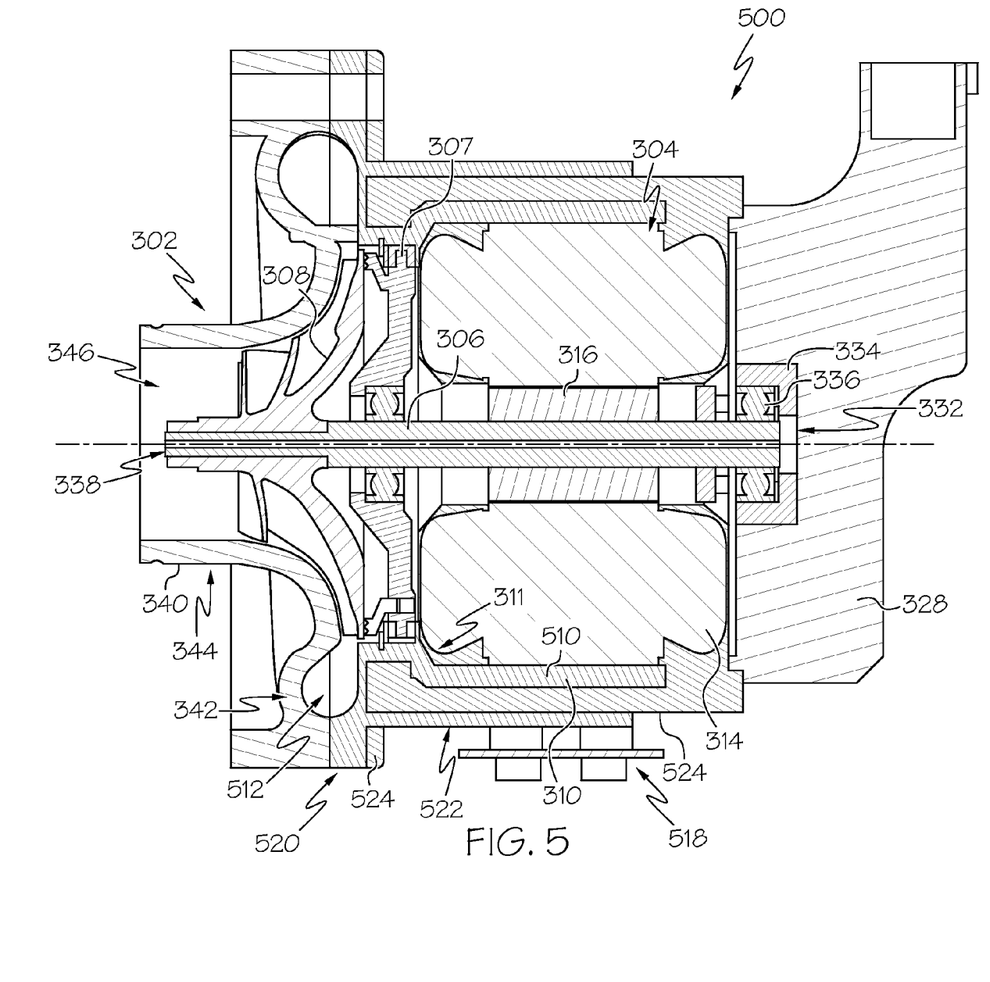
FIG. 5 is a cross-sectional view of another embodiment of a turbine assembly suitable for use in a throttle loss recovery system in accordance with one or more exemplary embodiments.

FIG. 5 depicts another embodiment of a turbine assembly 500 suitable for use as the turbine assembly 124 in the TLR assembly 102 of FIG. 1. Various elements or components of the turbine assembly 500 are similar to their counterparts described above in the context of FIGS. 3-4, and the common features and/or functionality will not be redundantly described herein in the context of FIG. 5. In the embodiment of FIG. 5, the conductive sleeve 510 includes an additional cantilevered mounting portion 522 that projects or otherwise extends from the end portion 520 that accesses the volute conduit 512. The cantilever portion 522 protrudes through the insulating overmold 524 and is exposed to the air or environmental conditions surrounding the turbine assembly 500. The protruding portion 522 is isolated from the portions of the conductive sleeve 510 that are in contact with the generator 304 by intervening portion of the insulating overmold 524, and the protruding portion 522 may be patterned, shaped, or otherwise configured to achieve desired heat transfer characteristics.

In the illustrated embodiment, the electronics assembly 518 including the electronics module 130 may be bonded, soldered, mounted, or otherwise affixed to the protruding mounting portion 522. In this regard, the conductive sleeve 510 may also function as a heat sink for the electronics assembly 518 by virtue of the direct physical contact and thermal coupling between the electronics assembly 518 and the protruding portion 522 in conjunction with the mass flow within the volute conduit 512 that interacts with the exposed surfaces of the end portion 520, which is integral with the protruding portion 522. Additionally, depending on the operating environment, the electronics assembly 518 may be cooled by the ambient air surrounding the turbine assembly 500. In some embodiments, through-holes may be formed between the electronics assembly 518 and the stator assembly 314 through the intervening portions of the conductive sleeve 510 and the overmold 524 to provide a path for electrically connecting the electronics assembly 518 to the stator assembly 314.

For the sake of brevity, conventional techniques related to turbines, turbo generators, throttle-loss recovery systems, heat transfer, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A turbine assembly comprising:
   a wheel configured to rotate in response to a portion of a fluid flow within a volute, the portion of the fluid flow bypassing a flow control valve;
   a generator including a stator assembly disposed about a rotor, the rotor being coupled to the wheel to rotate in response to rotation of the wheel;
   a metallic structure in contact with the stator assembly, an end portion of the metallic structure defining at least a portion of the volute, wherein the end portion of the metallic structure is exposed to the portion of the fluid flow within the volute; and
   an insulating structure radially encompassing the metallic structure and the generator.

2. The turbine assembly of claim 1, wherein the insulating structure defines at least a portion of the volute for the portion of the fluid flow.

3. The turbine assembly of claim 2, further comprising one or more guide vanes within the volute to direct the portion of the fluid flow towards the wheel, wherein the metallic structure contacts the one or more guide vanes.

4. The turbine assembly of claim 3, wherein the one or more guide vanes are integral with the metallic structure.

5. The turbine assembly of claim 2, further comprising a divider structure within the volute, wherein the metallic structure contacts the divider structure.

6. The turbine assembly of claim 1, wherein the metallic structure radially circumscribes at least a portion of the stator assembly.

7. The turbine assembly of claim 6, wherein the insulating structure comprises a thermoplastic molding compound.

8. The turbine assembly of claim 1, further comprising an electronics assembly including electronics electrically coupled to the stator assembly, wherein the electronics assembly contacts the metallic structure.

9. The turbine assembly of claim 8, wherein the electronics assembly is mounted on the metallic structure.

10. The turbine assembly of claim 1, further comprising:
a rotary shaft disposed within the stator assembly, the rotary shaft coupling the rotor to the wheel; and
a bearing assembly to support the rotary shaft disposed between the stator assembly and the wheel, wherein the metallic structure is configured to retain the bearing assembly.

11. The turbine assembly of claim 1, wherein the portion of the volute comprises a sidewall of the volute.

12. The turbine assembly of claim 1, wherein the portion of the volute comprises a boundary of the volute.

13. A system comprising:
a turbine including a volute for a portion of a fluid flow and a wheel to rotate in response to the portion of the fluid flow, the portion of the fluid flow bypassing a flow control valve based on an orientation of the flow control valve with respect to the fluid flow;
a generator including a stator assembly radially circumscribing a rotor, the rotor being coupled to the wheel to rotate in response to rotation of the wheel;
a metallic structure in contact with the stator assembly and defining at least a portion of the volute, wherein a portion of the metallic structure is exposed to the portion of the fluid flow within the volute; and
an insulating structure radially circumscribing the metallic structure and the generator.

14. The system of claim 13, further comprising one or more guide vanes within the volute to direct the portion of the fluid flow towards the wheel, wherein the metallic structure contacts the one or more guide vanes.

15. The system of claim 13, further comprising a divider structure within the volute, wherein the metallic structure contacts the divider structure.

16. The system of claim 15, further comprising a turbine housing defining at least a portion of the volute, wherein the divider structure is disposed between the turbine housing and the metallic structure.

17. A method of fabricating a turbine assembly, the method comprising:
forming a metallic structure in contact with a stator assembly of a generator, wherein an end portion of the metallic structure is configured to define a portion of a volute for a portion of a fluid flow, the portion of the fluid flow bypassing a flow control valve based on an orientation of the flow control valve with respect to the fluid flow;
forming an insulating structure about the metallic structure and the stator assembly after forming the metallic structure in contact with the stator assembly; and
mechanically coupling a turbine wheel to a rotor of the generator, the rotor being disposed within the stator assembly, wherein:
the turbine wheel is arranged to rotate in response to the portion of the fluid flow within the volute;
the end portion of the metallic structure is exposed to the portion of the fluid flow within the volute; and
the rotor rotates in response to rotation of the turbine wheel.

18. The method of claim 17, further comprising providing a bearing assembly within a retaining portion of the metallic structure prior to mechanically coupling the turbine wheel to the rotor, wherein:
the bearing assembly circumscribes a rotary shaft disposed within the stator assembly;
the rotor is coupled to the rotary shaft; and
providing the turbine wheel comprises joining the turbine wheel to a protruding portion of the rotary shaft that extends from the bearing assembly.

19. The method of claim 17, wherein forming the metallic structure in contact with the stator assembly comprises fitting a metallic sleeve over the stator assembly.

20. The method of claim 19, wherein forming the insulating structure about the metallic structure and the stator assembly comprises overmolding the metallic sleeve and the stator assembly after fitting the metallic sleeve over the stator assembly.

* * * * *